(12) United States Patent
Bulian et al.

(10) Patent No.: US 7,591,984 B2
(45) Date of Patent: Sep. 22, 2009

(54) PREPARATION OF TUNGSTEN OXIDE

(75) Inventors: Christopher J. Bulian, Yankton, SD (US); Robert C. Dye, Los Alamos, NM (US); Steven F. Son, Los Alamos, NM (US); Betty S. Jorgensen, Jemez Springs, NM (US); W. Lee Perry, Jemez Springs, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1300 days.

(21) Appl. No.: 10/629,489

(22) Filed: Jul. 28, 2003

(65) Prior Publication Data

US 2005/0025700 A1 Feb. 3, 2005

(51) Int. Cl.
*C01G 37/00* (2006.01)
(52) U.S. Cl. ........................................ 423/53
(58) Field of Classification Search ............... None
See application file for complete search history.

(56) References Cited

U.S. PATENT DOCUMENTS

| | | | | |
|---|---|---|---|---|
| 2,993,755 | A * | 7/1961 | Redanz | 423/606 |
| 3,452,106 | A * | 6/1969 | Sato et al. | 568/901 |
| 3,902,917 | A * | 9/1975 | Baresel et al. | 423/440 |
| 4,233,339 | A | 11/1980 | Leibowitz et al. | |
| 4,586,143 | A | 4/1986 | Kaneyasu et al. | |
| 5,525,264 | A | 6/1996 | Cronin et al. | |
| 5,788,738 | A | 8/1998 | Pirzada et al. | |
| 5,811,662 | A | 9/1998 | Williams et al. | |
| 5,911,965 | A | 6/1999 | Bailey et al. | |
| 5,984,997 | A | 11/1999 | Bickmore et al. | |
| 2002/0005145 | A1 * | 1/2002 | Sherman | 106/436 |

OTHER PUBLICATIONS

Livage et al., "Aqueous Precursors for Electrochromic Tungsten Oxide Hydrates," Solid State Ionics, Apr. 1996, vol. 84, No. 3-4, pp. 205-211.

Balazsi et al., "Development of Tungsten Oxide Hydrate Phases During Precipitation, Room Temperature Ripening and Hydrothermal Treatment," Solid State Ionics, Nov. 2002, vol. 151, No. 1-4, pp. 353-358.

J. P. Cronin, D. J. Tarico, J. C. L. Tonazzi, A. Agrawal, and S. R. Kennedy, "Microstructure and Properties of Sol-Gel Deposited $WO_3$ Coatings for Large Area Electrochromic Windows," Solar Energy Materials and Solar Cells, vol. 29, pp. 371-386, 1993.

M. A. Reiche, P. Hug, and A. Baiker, "Effect of Grafting Sequence on the Behavior of Titania-Supported $V_2O_5$—$WO_3$ Catalysts in the Selective Reduction of NO by $NH_3$," Journal of Catalysis, vol. 192, pp. 400-411, 2000.

(Continued)

*Primary Examiner*—Stanley Silverman
*Assistant Examiner*—Paul Wartalowicz
(74) *Attorney, Agent, or Firm*—Samuel L. Borkowsky (57) ABSTRACT

Tungsten trioxide hydrate ($WO_3 \cdot H_2O$) was prepared from a precursor solution of ammonium paratungstate in concentrated aqueous hydrochloric acid. The precursor solution was rapidly added to water, resulting in the crash precipitation of a yellow white powder identified as $WO_3 \cdot H_2O$ nanosized platelets by x-ray diffraction and scanning electron microscopy. Annealing of the powder at 200° C. provided cubic phase $WO_3$ nanopowder, and at 400° C. provided $WO_3$ nanopowder as a mixture of monoclinic and orthorhombic phases.

9 Claims, 9 Drawing Sheets

OTHER PUBLICATIONS

Xusheng Wang, Norio Miura, and Noboru Yamazoe, "Study of $WO_3$-Based Sensing Materials for $NH_3$, and NO Detection," Sensors and Actuators B, vol. 66, pp. 74-76, 2000.

I. Ruokamo, T. Karkkainen, J. Huusko, T. Ruokanen, M. Blomberg, H. Torvela, and V. Lantto, "$H_2S$ Response of $WO_3$ Thin-Film Sensors Manufactured By Silicon Processing Technology," Sensors and Actuators B, vol. 18-19, pp. 486-488, 1994.

Ismael Jimenez, Jordi Arbiol, Albert Cornet, and Joan Ramon Morante, "Structural and Gas-Sensing Properties of $WO_3$ Nanocrystalline Powders Obtained by a Sol-Gel Method From Tungstic Acid," IEEE Sensors Journal, vol. 2, No. 4, pp. 329-335, Aug. 2002.

M. Regragui, M. Addou, A. Outzourkit, J. C. Bernede, Elb. El ldrissi, E. Benseddik, and A. Kachouane, "Preparation and Characterization of Pyrolytic Spray Deposited Electrochromic Tungsten Trioxide Films," Thin Solid Films, vol. 358, pp. 40-45, 2000.

Morito Akiyama, Jun Tamaki, Norio Miura, and Noboru Yamazoe, "Tungsten Oxide-Based Semiconductor Sensor Highly Sensitive to NO and $NO_2$," Chemistry Letters, pp. 1611-1614, 1991.

M. Gotic, M. lvanda, S. Popovic, and S. Music, "Synthesis of Tungsten Trioxide Hydrates and Their Structural Properties," Materials Science and Engineering, vol. B77, pp. 193-201, 2000.

Cs. Balazsi, M. Farkas-Jahnke, I. Kotsis, L. Petras, and J. Pfeifer, "the Observation of Cubic Tungsten Trioxide at High-Temperature Dehydration of Tungstic Acid Hydrate," Solid State Ionics, vol. 141-142, pp. 411-416.

Cs. Balazsi, "Development of Tungsten Oxide Hydrate Phases During Precipitation-Washing-Ripening Process," Materials Structure, vol. 6, num. 6, pp. 135-139, 1999.

* cited by examiner

PREPARATION OF TUNGSTEN OXIDE

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to tungsten oxide and more particularly to a precursor solution and simple and inexpensive method for preparing nanoscale powders of tungsten trioxide hydrate ($WO_3 \cdot H_2O$), tungsten trioxide ($WO_3$) and tungsten dioxide ($WO_2$).

BACKGROUND OF THE INVENTION

Tungsten trioxide ($WO_3$) has been used in electrochromic devices, catalysts, gas sensors, and for other important applications (for electrochromic devices, see U.S. Pat. No. 5,911,965 to J. A. Bailey entitled "Process for Producing Tungsten Oxide," which issued Jun. 15, 1998; and J. P. Cronin, D. J. Tarico, J. C. L. Tonazzi, A. Agrawal, and S. R. Kennedy, "Microstructure and Properties of Sol-Gel Deposited $WO_3$ Coatings for Large Electrochromic Windows, Solar Energy Materials and Solar Cells, vol. 29, pp. 371-386, 1993; for catalysts, see M. A. Reiche, P. Hug, and A. Baiker, "Effect of Grafting Sequence on the Behavior of Titania-Supported $V_2O_5$—$WO_3$ catalysts in the selective reduction of NO by $NH_3$," J. Catal., vol. 192, pp. 400-411, 2000; for gas sensors, see U.S. Pat. No. 4,586,143 to M. Kaneyasu et al. entitled "Gas Detecting Apparatus," which issued Apr. 29, 1986; U.S. Pat. No. 5,811,662 to D. E. Williams et al. entitled "Resistive Gas Sensing, Especially for Detection of Ozone," which issued Sep. 22, 1998; and X. Wang, N. Miura, and N. Yamazoe, "Study of $WO_3$-Based Sensing Materials for $NH_3$ and NO Detection," Sensors and Actuators, B, Chemical, vol. 66, pp. 74-76, 2000, all of which are incorporated by reference herein).

The method used for preparing $WO_3$ often depends on the desired application. Methods for preparing thin films, for example, often differ from those used to prepare $WO_3$ in bulk powder form. Thin films of $WO_3$ have been prepared by sputtering, chemical vapor deposition, plasma based methods, spray pyrolysis, and dip coating (for sputtering methods, see, for example, I. Ruokamo, T. Kärkkäinen, J. Huusko, T. Ruokanen, M. Blomberg, H. Torvela, and V. Lantto, "$H_2S$ Response of $WO_3$ Thin-Film Sensors Manufactured by Silicon Processing Technology," Sensors and Actuators B, vol. 18-19, pp. 486-488, 1994; for chemical vapor deposition, see U.S. Pat. No. 4,233,339 to M. Leibowitz entitled "Method for Making Electrochromic Films Having Improved Etch Resistance," which issued Nov. 11, 1980; for plasma based methods, see U.S. Pat. No. 5,788,738 to S. Pirzada et al. entitled "Method for Producing Nanoscale Powders by Quenching of Vapors," which issued Aug. 4, 1998; for spray pyrolysis, see M. Regragui, M. Addou, A. Outzourhit, J. C. Bernede, Elb. El Idrissi, E. Beneseddik and A. Kachouane, "Preparation and Characterization of Pyrolytic Spray Deposited Electrochromic Tungsten Trioxide Films," Thin Solid Films, vol. 358, pp. 40-45, 2000; and for dip coating, see U.S. Pat. No. 5,911,965 to Bailey et al., vide supra, and U.S. Pat. No. 5,525,264 to J. P. Cronin et al. entitled "Precursor Solutions for Forming Coatings," which issued Jun. 11, 1996, all of which are incorporated by reference herein).

Examples of methods for preparing bulk $WO_3$ powder, and nanosized powder particles in particular, can be found in the following references, all incorporated by reference herein: I. Jimenez, J. Arbiol, A. Cornet, and J. R. Morante, "Structural and Gas-Sensing Properties of $WO_3$ Nanocrystalline Powders Obtained by a Sol-Gel Method from Tungstic Acid," IEEE Sensors Journal, vol. 2, no. 4, pp. 329-335, 2002; U.S. Pat. No. 5,788,738 vide supra; U.S. Pat. No. 5,984,997 to C. Bickmore entitled "Combustion of Emulsions: A Method and Process for Producing Fine Powders," which issued Nov. 16, 1999; and M. Akiyama, J. Tamaki, N. Miura, and N. Yamazoe, "Tungsten Oxide-Based Semiconductor Sensor Highly Sensitive to NO and $NO_2$," Chemistry Letters, pp. 1611, 1991.

There remains a need for a simple, scalable, and inexpensive method for preparing $WO_3$ nanopowder.

Accordingly, an object of the present invention is to provide a simple, scalable, and inexpensive method for preparing $WO_3$ nanopowder.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a solution of a combination of ammonium paratungstate and hydrochloric acid.

The present invention also includes a solution prepared by combining ammonium paratungstate with hydrochloric acid.

The present invention also includes a method for preparing $WO_3 \cdot H_2O$ comprising preparing a precursor solution of a combination of ammonium paratungstate and hydrochloric acid, and combining the precursor solution with water to form a precipitate, and isolating the precipitate.

The present invention also includes a method for preparing anhydrous $WO_3$ nanopowder. The method involves preparing a precursor solution of ammonium paratungstate and hydrochloric acid, combining the precursor solution with water to form a precipitate, isolating the precipitate, and heating the precipitate to form the anhydrous $WO_3$ nanopowder.

The present invention also includes a method for preparing $WO_2$. The method involves preparing a precursor solution of ammonium paratungstate and hydrochloric acid, combining the precursor solution with water to form a precipitate, isolating the precipitate, heating the precipitate to form the anhydrous $WO_3$ nanopowder, and reacting the anhydrous $WO_3$ nanopowder with hydrogen gas to form $WO_2$.

The present invention also includes tungsten trioxide hydrate ($WO_3 \cdot H_2O$) nanosized particles having a platelet morphology prepared by combining water with a precursor solution comprising a combination of ammonium paratungstate and hydrochloric acid to form a precipitate, and isolating the precipitate that comprises $WO_3 \cdot H_2O$.

The present invention also includes tungsten trioxide hydrate ($WO_3 \cdot H_2O$) nanosized particles having a platelet morphology.

BRIEF DESCRIPTION OF THE DRAWINGS

The accompanying drawings, which are incorporated in and form a part of the specification, illustrate the embodiment (s) of the present invention and, together with the description, serve to explain the principles of the invention. In the drawings:

FIG. 2b shows a magnified portion of FIG. 2a, and FIG. 2c shows a scanning electron micrograph of the product of FIG. 1 with a particularly good side view of platelets;

FIG. 3b shows a magnified portion of FIG. 3a;

FIG. 7a shows a scanning electron micrograph of the material formed by reacting the material of FIG. 5 with $H_2$ and FIG. 7b shows a magnified portion of FIG. 7a.

DETAILED DESCRIPTION

The invention includes a method for preparing tungsten oxide hydrate ($WO_3.H_2O$) nanopowder and tungsten oxide nanopowder ($WO_x$, x is 2 or 3). The invention also includes a precursor solution for making these nanopowders. For the purposes of this invention, nanopowders are defined as powders of nanoparticles, a nanoparticle being a nanosized particle having all dimensions less than one micron.

The precursor solution is prepared by combining ammonium paratungstate and concentrated hydrochloric acid. For the purposes of the invention, concentrated hydrochloric acid is defined as an aqueous solution of hydrochloric acid that is at least 15 percent by weight hydrochloric acid. Preferably, a more concentrated hydrochloric acid solution (one that contains about 35 to 38 weight percent hydrochloric acid was used in the EXAMPLES, vide infra) because the solubility of ammonium paratungstate is higher in a more concentrated hydrochloric acid solution. In addition, when an aqueous solution that is less concentrated in hydrochloric acid is used, the solution is unstable and large particles (larger than nanosized) crystallize spontaneously from solution.

After preparing the precursor solution, the next step is to pour the precursor solution into a much larger volume of water. This rapid combination is necessary to crash precipitate the solid and minimize the formation of larger than nanosized particles.

Next, the crash precipitated product was washed. The washing procedure included sonication and rinsing with water to remove impurities, and centrifugation to remove most of the water from the precipitate.

Next, the wet precipitate that remained was heated in air at a temperature of about 100° C. until a powder formed. The powder was first sent through a sieve to break up any macroscopic agglomerates and then annealed in the air for several hours. The annealing temperatures used were either 200° C. or 400° C. Annealing times may vary from about 5 hours to about 18 hour.

The pre-annealed and post annealed powder was subjected to a variety of techniques that include x-ray diffraction, scanning electron microscopy, Raman spectroscopy, BET analysis, and thermal gravimetric analysis (TGA). These techniques were used to provide details related to the chemical composition, phase, and morphology of the product. The following EXAMPLES provide additional details for preparing precursor solution, hydrated tungsten oxide ($WO_3.H_2O$), tungsten trioxide ($WO_3$), and tungsten dioxide ($WO_2$).

EXAMPLE 1

Preparation of precursor solution, hydrated $WO_3$, and $WO_3$. Ammonium paratungstate (($NH_4)_{10}W_{12}O_{41}$, 0.700 grams) was dissolved in 20 milliliters (ml) of concentrated hydrochloric acid (35-38 per cent by weight hydrochloric acid in water) under sonication to form a clear, precursor solution.

The precursor solution was added rapidly to about 80 ml of distilled water, resulting in the crash precipitation of a yellow-white precipitate. Most of the water was separated from the precipitate by centrifugation and then decantation of the supernatant water. The wet yellow white solid that remained was washed with distilled water (4×40 ml). Sonication during the final wash was intended to provide a more thorough washing step.

Figure 1:
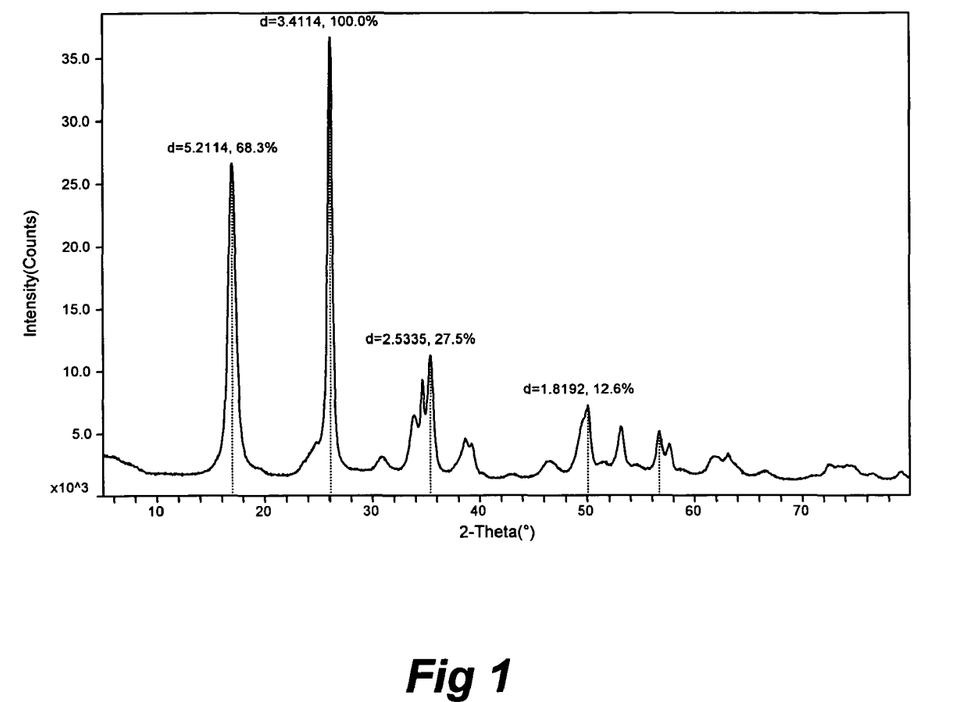
FIG. 1 shows an x-ray diffraction pattern of the crash precipitation product produced by pouring a solution of ammonium paratungstate and hydrochloric acid into water, washing the precipitate, and drying the precipitate at 100° C.

After the washing procedure, the wet yellow solid was heated at 100° C. in the air to remove additional water and provide a dry powder. An X-ray diffraction pattern of this powder is shown in FIG. 1. After comparing this x-ray diffraction pattern to x-ray diffraction patterns reported for $WO_3.0.33H_2O$ and $WO_3.H_2O$ (see M. Gotić, M. Ivanda, S. Popović and S. Musić in "Synthesis of Tungsten Trioxide hydrates and their Structural Properties," Materials Science and Engineering, vol. B77, pp. 193-201, 2000, incorporated by reference herein), it was concluded that the crash precipitation product formed was $WO_3.H_2O$.

Figure 2A:
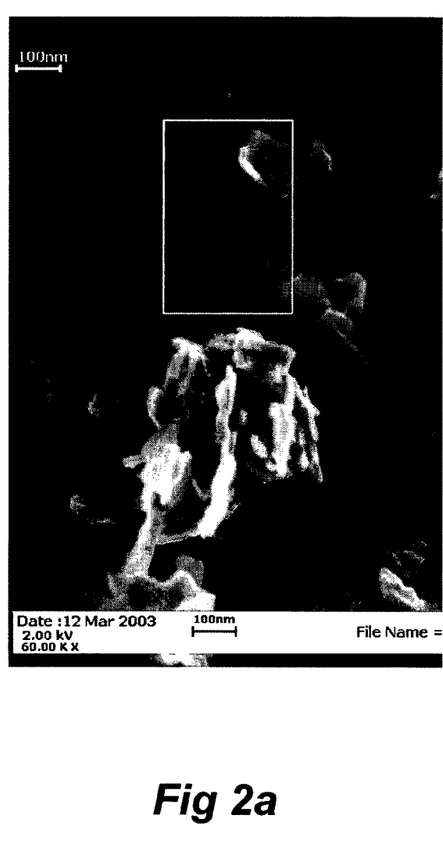
FIG. 2a shows a scanning electron micrograph of the product of FIG. 1.
Figure 2B:
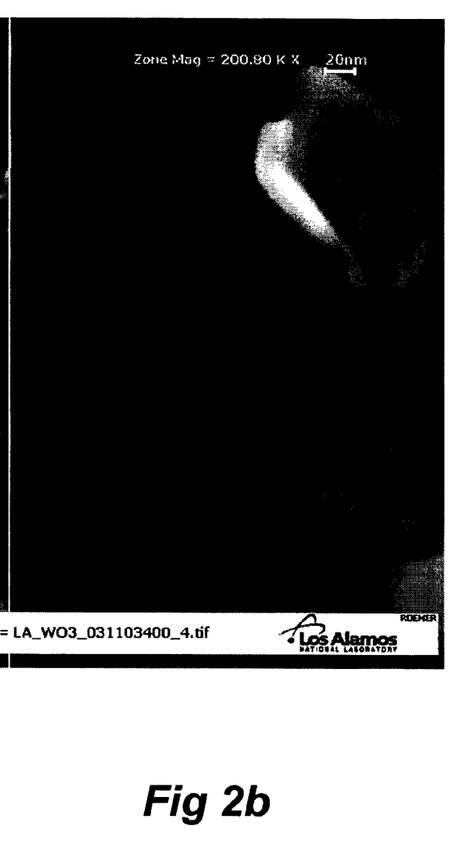
Figure 2C:
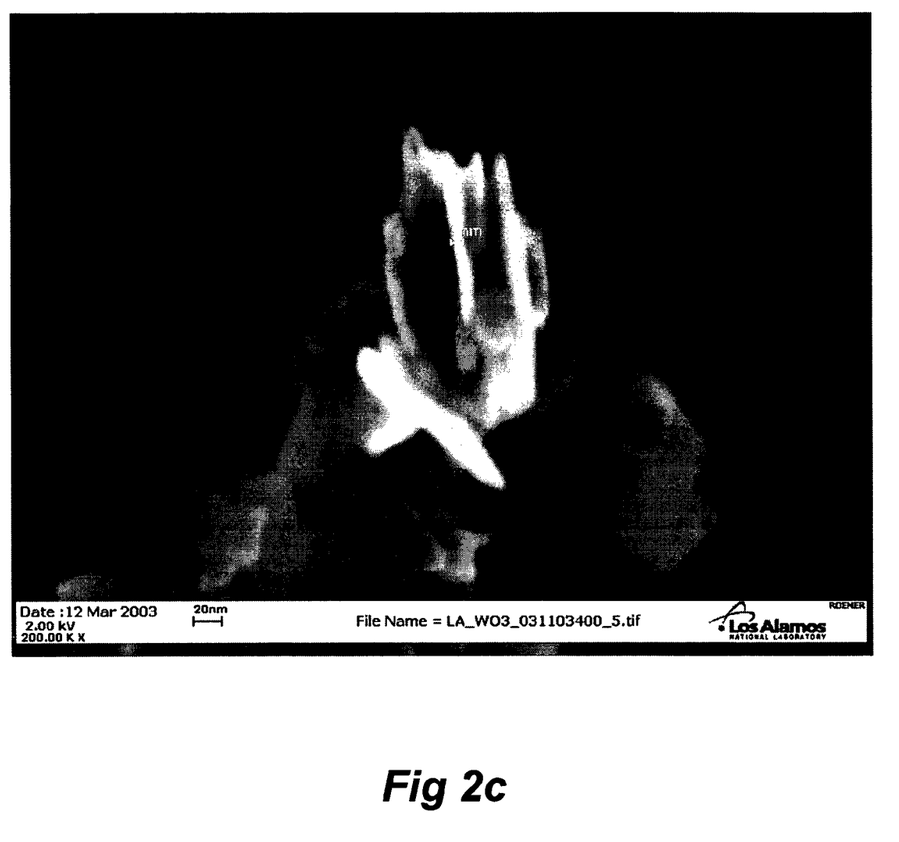

A scanning electron micrograph of the powder is shown in FIG. 2a, a magnified portion of which is provided in FIG. 2b. The particles shown in FIG. 2a-b clearly have a platelet morphology, the details of which are more apparent in FIG. 2b. A scale of a unit length of 20 nanometers (nm) inserted into FIG. 2b demonstrates that the platelets are nanosized. FIG. 2c provides a side view of several platelets and a scale of unit length 9 nanometers superimposed along the thickness dimension of one of the platelets. From this side view, it appears that most of the annealed platelets have a thickness of less than about 10 nanometers and that the other dimensions also appear to be nanosized. BET analysis shows that the platelets have a high specific surface area, approximately 40 $m^2/g$.

Figure 3A:
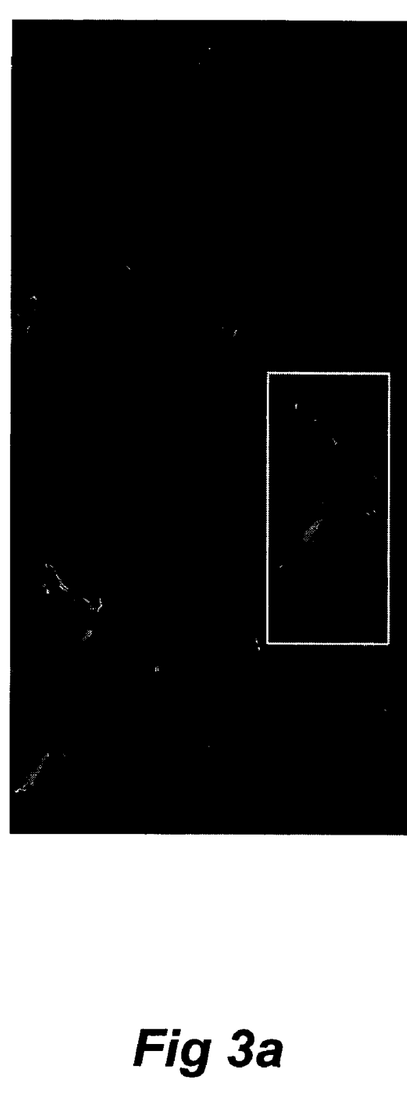
FIG. 3a shows a scanning electron micrograph of the material produced by annealing the product of FIG. 1 at 200° C. for 12 hours
Figure 3B:
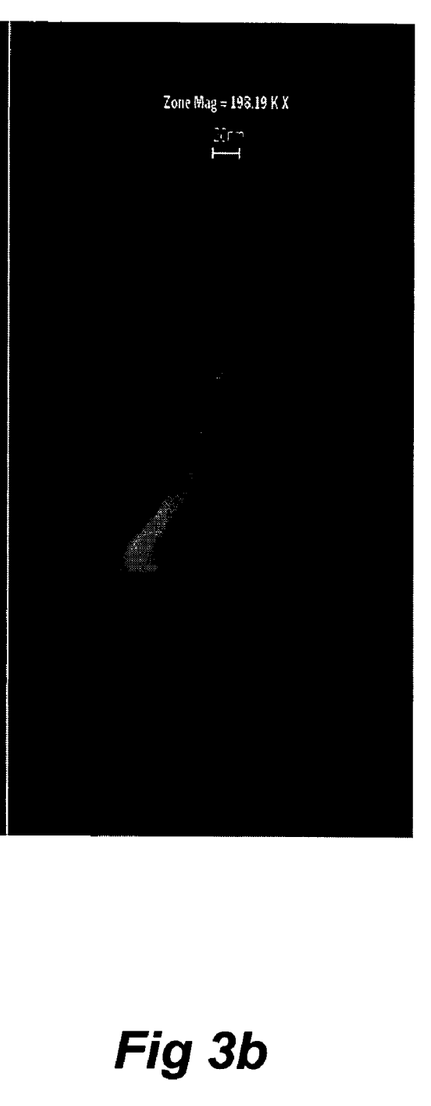

The powder was annealed for 12 hours at 200° C. in the air. Scanning electron micrograph of the annealed powder is shown in FIGS. 3a-b. The particles of FIG. 3 have a platelet morphology similar to the morphology of the platelets shown in FIG. 1. Small angle scattering (SAX) measurements were used to determine the platelet thickness of the annealed platelets to be 7 nm±0.2 nm.

Figure 4:
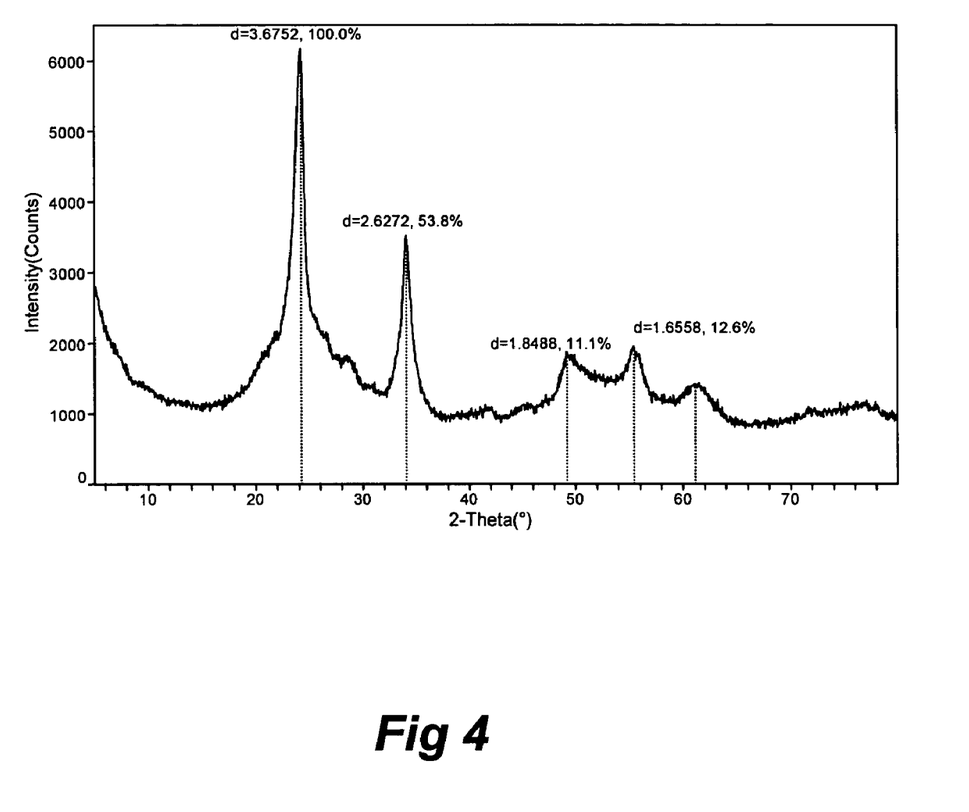
FIG. 4 shows the x-ray diffraction pattern of the material produced by annealing the product of FIG. 1 at 200° C. for 12 hours.

The x-ray diffraction pattern of the annealed platelets is shown in FIG. 4. From a comparison of this x-ray diffraction pattern with x-ray diffraction patterns reported for $WO_3$, it was concluded that the annealed powder was substantially cubic phase $WO_3$. BET analysis shows that the specific surface area decreased after annealing to approximately 25 $m^2/g$.

EXAMPLE 2

Figure 5:
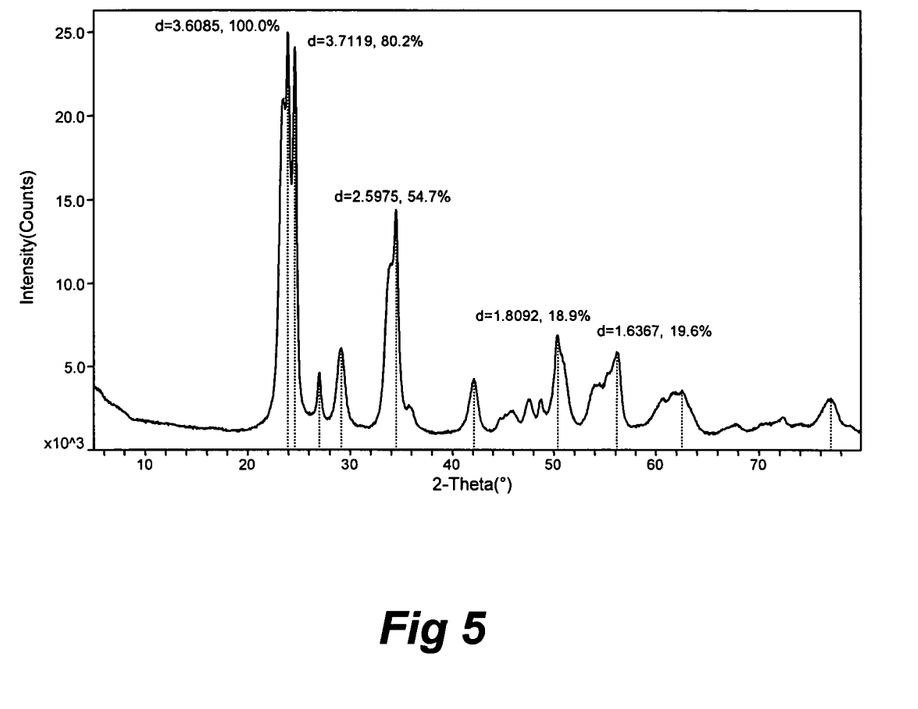
FIG. 5 shows the x-ray diffraction pattern of the material formed by annealing the product of FIG. 1 at a temperature of 400° C.
Figure 6:
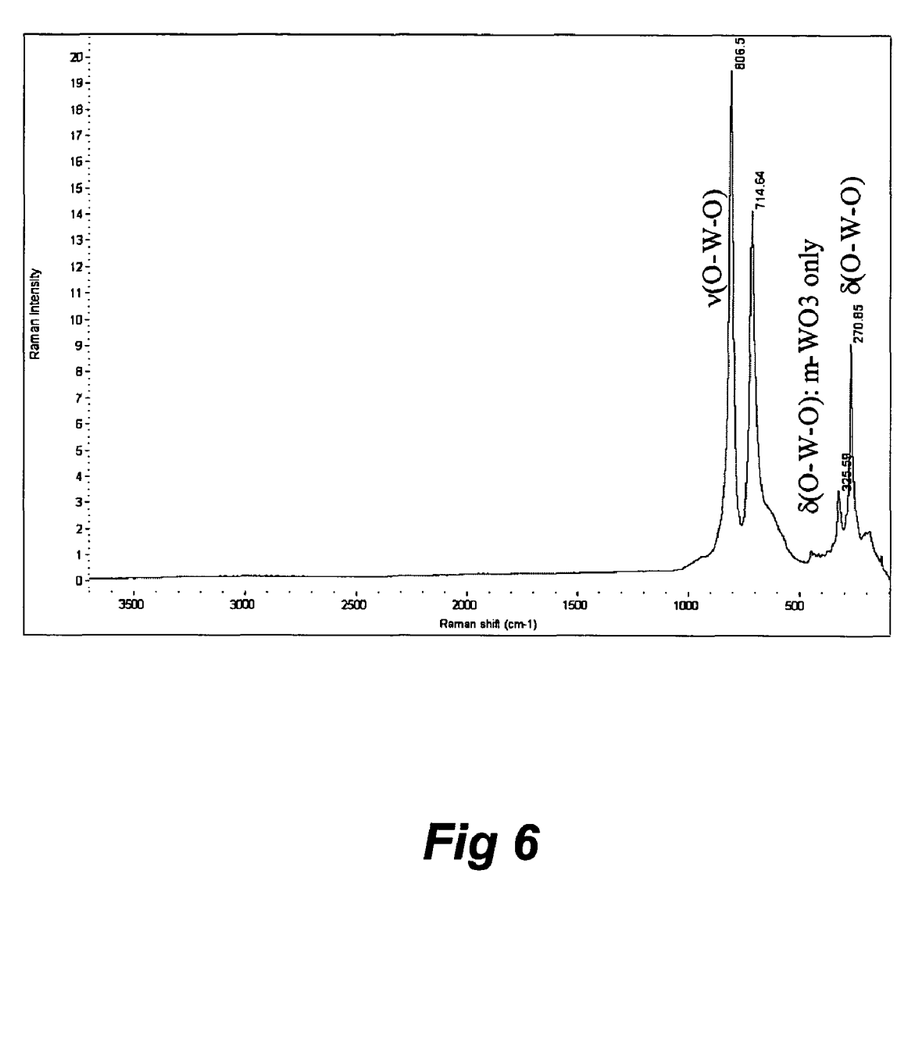
FIG. 6 shows a Raman spectrum of the material formed by annealing the product of FIG. 1 at a temperature of 400° C.

Tungsten trioxide ($WO_3$) was prepared according to the procedure of EXAMPLE 1 with the exception that the annealing temperature used was 400° C. instead of 200° C. An x-ray diffraction pattern of the resulting powder is shown in FIG. 5. This x-ray diffraction pattern is consistent with the presence of a mixture of monoclinic and orthorhombic phases of $WO_3$ (see Cs. Balázsi, M. Farkas-Jahnke, I. Kotsis, L. Petrás, and J. Pfeifer, "The Observation of Cubic $WO_3$ at High Temperature Dehydration of Tungstic Acid Hydrate," Solid State Ionics, vol. 141-142, p. 411, 2001, incorporated by reference herein). This conclusion was further supported by an analysis of the annealed powder by Raman spectroscopy. The Raman spectrum of the annealed powder is shown in FIG. 6. The peaks that appear at 325.6 $cm^{-1}$, 806.5 $cm^{-1}$ and 714.6 $cm^{-1}$ may be assigned to the O-W-O stretching mode and the peak at 270.9 $cm^{-1}$ to the O-W-O bending mode. The peak at 325.6 $cm^{-1}$ corresponds to the O-W-O stretching mode previously observed for monoclinic $WO_3$.

EXAMPLE 3

The procedure of EXAMPLE 1 for preparing $WO_3.H_2O$ was scaled up. Ammonium paratungstate (8.98 g) was added slowly to 257 milliliters (ml) of concentrated hydrochloric acid (35-38 per cent by weight hydrochloric acid in water) and stirred slowly for about 5 minutes until all of the ammonium paratungstate dissolved, producing a nearly clear solution that became completely clear after probe sonication at 40% amplitude for about 2 minutes. This solution was immediately poured into distilled water (1026 ml), forming a precipitate. The precipitate was washed several times with distilled water, and the resulting wet precipitate was dried for several hours at 100° C. until a dry powder formed.

EXAMPLE 4

Figure 7A:
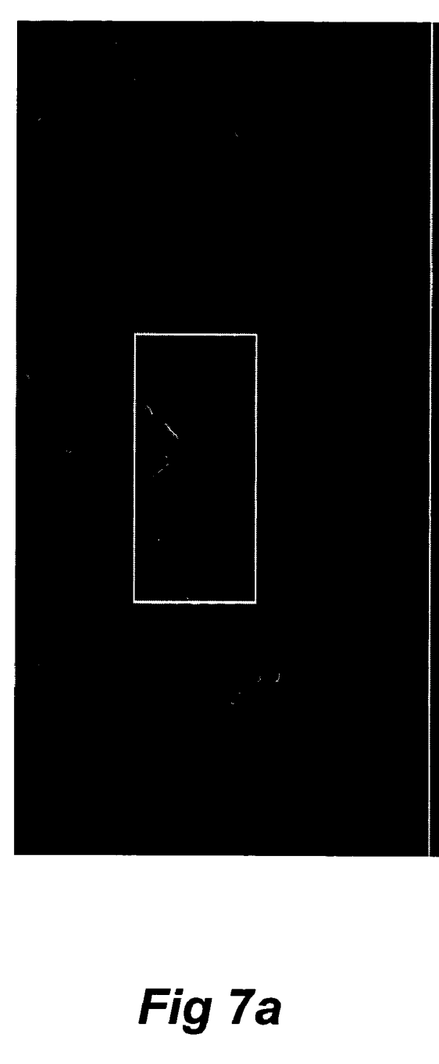
Figure 7B:
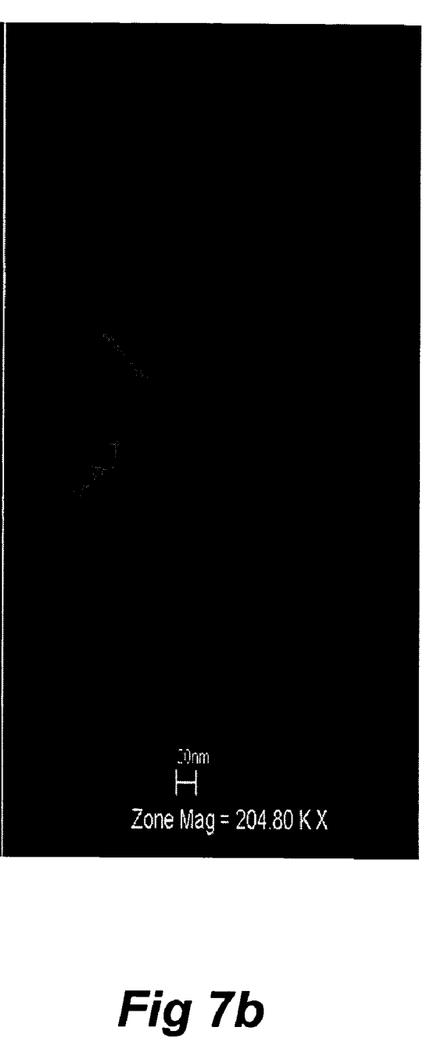
Figure 8:
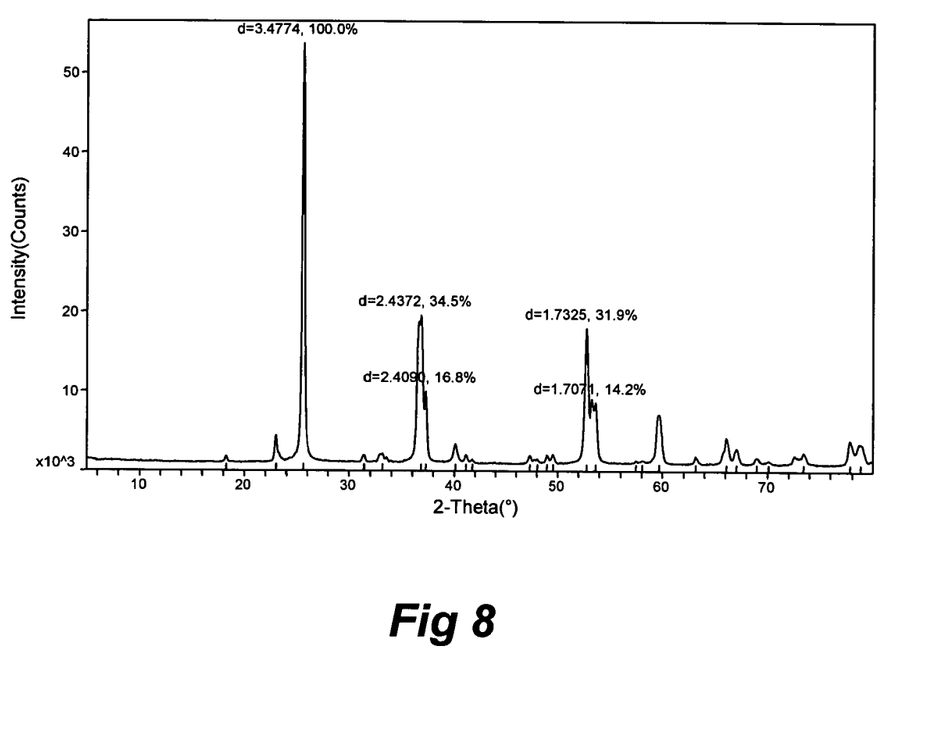
FIG. 8 shows an x-ray diffraction pattern of the material formed by reacting the material of FIG. 5 with $H_2$.

Preparation of $WO_2$. The powder of EXAMPLE 3 was reacted with $H_2$. A sample of the powder was placed in a thermal gravimetric analysis (TGA) apparatus. The temperature of the sample was increased from room temperature to about 650° C. at a rate of about 10 degrees Celsius per minute while flowing a gaseous mixture of about 4 percent hydrogen ($H_2$) in helium over the sample until the sample lost 6.9 percent of its initial mass. The results from this analysis were used to scale up the process using a 1-inch programmable tube furnace. Scanning electron micrographs of the resulting blue powder are shown in FIGS. 7*a-b* and an x-ray diffraction pattern is shown in FIG. 8. The x-ray diffraction pattern is consistent with tungsten dioxide, $WO_2$ (see Cs. Balázsi, M. Farkas-Jahnke, I. Kotsis, L. Petrás, and J. Pfeifer, "The Observation of Cubic $WO_3$ at High Temperature Dehydration of Tungstic Acid Hydrate," Solid State Ionics, vol. 141-142, p. 411, 2001). The reduction procedure resulted in agglomeration and crystal growth to micron sized particles. BET analysis indicated that the specific surface area decreased from 27.1 to 8.4 $m^2/g$.

Advantages of the present invention relate to the ease of preparation of the precursor solution (dissolving a material into hydrochloric acid), and ease of preparing all subsequent materials (pouring the precursor solution into water, heating, etc.), scalability of the process, and relative cost savings compared to other known methods of preparation. Micron-sized particles of tungsten trioxide hydrate having a platelet morphology have been reported. To our knowledge, this invention provides the first process for preparing nano-sized platelets of tungsten oxide hydrate and the first report of nano-sized platelets of tungsten oxide prepared by any method.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A solution comprising a combination of ammonium paratungstate and hydrochloric acid.

2. A solution prepared by combining ammonium paratungstate with hydrochloric acid.

3. The solution of claim 1 wherein said hydrochloric acid comprises an aqueous solution of about 35-38 weight percent of hydrochloric acid.

4. A method for preparing $WO_3.H_2O$ comprising preparing a precursor solution comprising a combination of ammonium paratungstate and hydrochloric acid and combining the precursor solution with water to form a precipitate, and isolating the precipitate.

5. A method for preparing anhydrous $WO_3$ nanopowder comprising preparing a precursor solution comprising ammonium paratungstate and hydrochloric acid, combining the precursor solution with water to form a precipitate, isolating the precipitate, and heating the precipitate to form the anhydrous $WO_3$ nanopowder.

6. The method of claim 5, wherein the isolated precipitate is heated at a temperature of from about 200° C. to about 400° C. to form the $WO_3$ nanopowder.

7. A method for preparing $WO_2$ comprising preparing a precursor solution comprising ammonium paratungstate and hydrochloric acid, combining the precursor solution with water to form a precipitate, isolating the precipitate, and heating the precipitate to form the anhydrous $WO_3$ nanopowder, and reacting the anhydrous $WO_3$ nanopowder with hydrogen gas to form $WO_2$.

8. Tungsten trioxide hydrate ($WO_3.H_2O$)nanosized particles prepared by combining water with a precursor solution comprising a combination of ammonium paratungstate and hydrochloric acid.

9. Tungsten trioxide hydrate ($WO_3.H_2O$) nanosized particles having a platelet morphology.

\* \* \* \* \*